No. 877,739.  
PATENTED JAN. 28, 1908.

H. RÖCHLING & W. RODENHAUSER.

MEANS FOR OBTAINING THIN LIQUID DROSS IN ELECTRIC FURNACES FOR METALLURGICAL PURPOSES.

APPLICATION FILED SEPT. 7, 1906.

WITNESSES  
M. Petit  
Geo. J. Sweeney

INVENTORS  
Hermann Röchling  
Wilhelm Rodenhauser  
By Richards & Co.  
ATT'YS

UNITED STATES PATENT OFFICE.

HERMANN RÖCHLING AND WILHELM RODENHAUSER, OF VÖLKLINGEN-ON-THE-SAAR, GERMANY.

MEANS FOR OBTAINING THIN LIQUID DROSS IN ELECTRIC FURNACES FOR METALLURGICAL PURPOSES.

No. 877,739.

Specification of Letters Patent.

Patented Jan. 28, 1908.

Application filed September 7, 1906. Serial No. 333,688.

*To all whom it may concern:*

Be it known that we, HERMANN RÖCHLING, manufacturer, and WILHELM RODENHAUSER, engineer, subjects of the German Emperor, residing at Völklingen-on-the-Saar, in the Empire of Germany, have invented new and useful Improvements in Means for Obtaining Thin Liquid Dross in Electric Furnaces for Metallurgical Purposes, of which the following is a specification.

The present invention relates to electric furnaces used for metallurgical purposes and an important object is improved means for obtaining thin liquid dross in said furnaces.

In obtaining metals from their ores, in refining iron, and in similar metallurgical processes, it is of considerable importance not only for the course of the process, but also for the quality of the desired products, that the dross, slag or the like be obtained in as hot and thin liquid state as possible. The attainment of this aim offers special difficulties in the case of electric furnaces, because the supply of current from and to the electrodes is influenced in a high degree by the contact with the dross. For the purpose of overcoming this objection it has already been proposed to let the electrodes of the secondary circuit end above the mass of dross, so that the secondary current must take its path from the electrode through an air-gap and through the layer of dross. These means demand however, a uselessly high consumption of energy, and also very heavy demands are put upon the electrodes.

The present invention relates to an arrangement whereby the electric current serving for the fusion of the material to be smelted, is compelled at certain points in the smelting space, to pass exclusively through the stratum of slag on the surface, so that at these points the slag will be highly heated and liquefied. This is effected by damlike projections of the floor in the smelting space. With skilful operation of the furnace only the layer of slag stands above the floor projections, which in consequence is highly heated by the secondary current.

Figure 1:
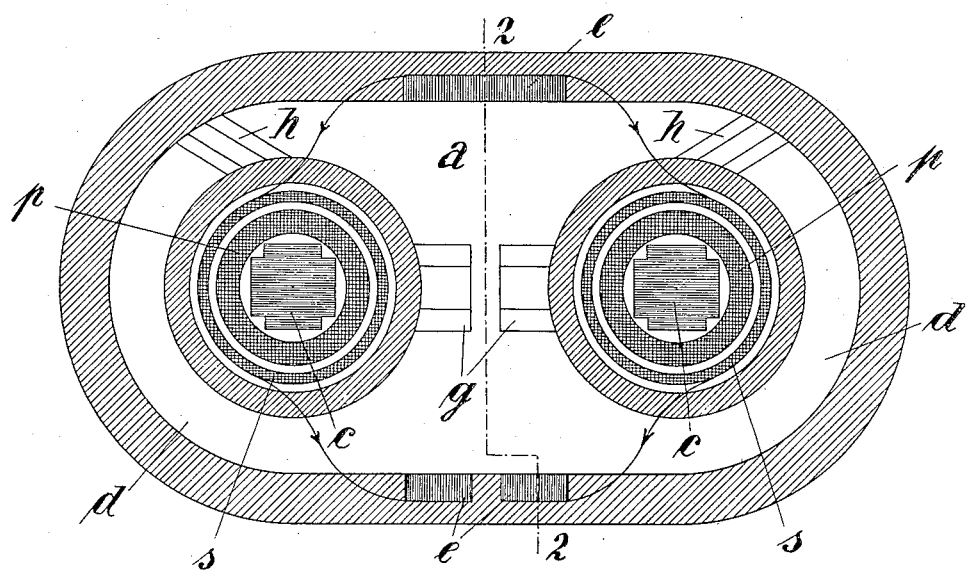
Figure 2:
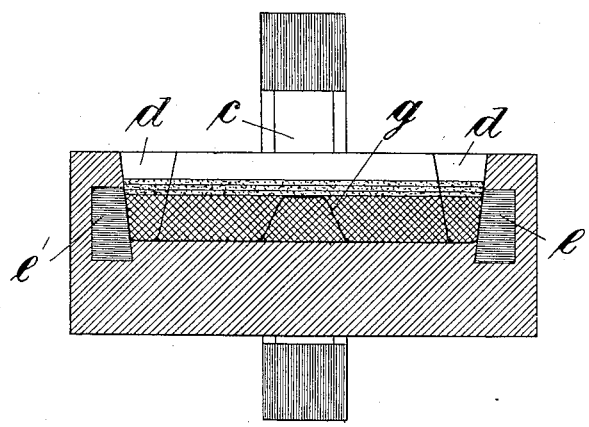

The invention is shown in the accompanying drawing in which:

Figure 1 is a horizontal section and Fig. 2 is a vertical section on line 2—2 of Fig. 1.

As shown the transformer core $c$ together with the winding $s$, $p$ is set into the furnace itself in such manner that the smelting channels, $d$ surround the branch of the transformer in circular form, and in which the portions of the smelting channels, lying between the two branches are expanded into a hearthlike chamber; in consequence of the inductive effect of the primary winding $p$ of the transformer, there is excited in the known manner, in the material inclosed in the smelting channels, which represents a sort of secondary winding, an intensely powerful electric current, the energy of which being changed into heat, fuses the materials; in order also to impart to the material contained in the enlarged hearth, $a$, the heat required for its fusion by means of the electrode plates $e$ let into the wall of the furnace, a particularly strong current is caused to pass through the hearth which is likewise induced in the secondary coils located on the branch of the transformer. The tap hole of the furnace is located in one of its longitudinal walls; the electrode let into this must therefore be broken in the center as the drawing shows.

The damlike projections at the bottom, that are the object of the invention in question, are designated $g$ and $h$ in the drawing. Their cross section is shown in Fig. 2. The bottom projections are so formed that their upper edge is uniform with the dividing layer between the molten product and the slag, as may be seen in Fig. 2. The bottom projection $g$ is in the hearth like expansion $a$ of the smelting space, the bottom projections $h$ are disposed in the smelting channels. The slit like opening in the bottom projection $g$ has for its object to permit the exit of the molten material inclosed between the bottom projections $g$, $h$ when the tap hole is opened.

I claim:

In an electric furnace of the type described, a smelting hearth, damlike ridges $g$, $h$ arranged within the smelting hearth and smelting channels $d$ projecting upwards to such a height above the bottom, that the top edges of the ridges may be flush with the surface of the metal bath, when melted in the furnace whereby the electric current heating the metal bath is forced to pass at these places through the layer of dross floating above the metal bath.

In testimony whereof we have signed our names to this specification in the presence of two subscribing witnesses.

HERMANN RÖCHLING.
WILHELM RODENHAUSER.

Witnesses:
BESSIE F. DUNLAP,
LOUIS VANDORY.